(12) United States Patent
Fournier

(10) Patent No.: US 11,709,720 B1
(45) Date of Patent: Jul. 25, 2023

(54) PROTOCOL FOR CORRELATING USER SPACE DATA WITH KERNEL SPACE DATA

(71) Applicant: Datadog, Inc., New York, NY (US)

(72) Inventor: Guillaume Fournier, New York, NY (US)

(73) Assignee: Datadog, Inc., New York, NY (US)

( * ) Notice: Subject to any disclaimer, the term of this patent is extended or adjusted under 35 U.S.C. 154(b) by 0 days.

(21) Appl. No.: 17/652,624

(22) Filed: Feb. 25, 2022

(51) Int. Cl.
*G06F 9/54* (2006.01)

(52) U.S. Cl.
CPC .............. *G06F 9/542* (2013.01); *G06F 9/547* (2013.01)

(58) Field of Classification Search
CPC ..... G06F 9/542; G06F 16/1734; H04L 41/06; H04L 41/0604
USPC ........................................................ 719/318
See application file for complete search history.

(56) References Cited

U.S. PATENT DOCUMENTS

| 10,761,965 | B2 * | 9/2020 | Radu ................... G06F 11/3644 |
| 11,507,672 | B1 * | 11/2022 | Pagnozzi ............ H04L 63/0263 |
| 2022/0083644 | A1 * | 3/2022 | Kulshreshtha ......... G06N 20/00 |

OTHER PUBLICATIONS

Notes.volution.ro [online], "Exfiltrating Go current goroutine ID," Aug. 4, 2019, retrieved on Aug. 29, 2022, retrieved from URL<https://notes.volution.ro/v1/2019/08/notes/23e3644e/>, 9 pages.

* cited by examiner

*Primary Examiner* — Andy Ho
(74) *Attorney, Agent, or Firm* — Fish & Richardson P.C.

(57) ABSTRACT

Methods and systems are configured for monitoring operations of a computing device by associating threads executing in a user space with kernel events in a kernel space. The systems and methods are configured for detecting a kernel event in the kernel space of the computing device; in response to detecting the kernel event, accessing, from a mapping table that maps a computing thread in the user space to a span that is active on the computing thread, a base address of a memory in the user space of the computing device, the memory storing a span identifier for each span in the user space, the span comprising one or more operations of a computing thread that is active in the user space; accessing, based on the base address, a span identifier in the memory; and associating the span identifier with the kernel event.

20 Claims, 12 Drawing Sheets

PROTOCOL FOR CORRELATING USER SPACE DATA WITH KERNEL SPACE DATA

TECHNICAL FIELD

The disclosure relates to performance monitoring of applications executing on computing systems. Specifically, this application relates to databases and data storage methods for correlating data from an application execution environment and a kernel execution environment.

BACKGROUND

During execution of a computer program, a system generates data for reporting how the program is executing. The generated data includes a stack trace that illustrates how the program has executed (such as execution of a specific code path for the execution). When a computing system is executing an application, a stack trace is generated representing how the application is executing for application performance monitoring (APM). Concurrently, the computing system generates event data representing operations performed by the operating system of the computing system.

SUMMARY

This disclosure describes a monitoring system that is configured to monitor a computing network of one or more computing systems. The computing systems of the network are configured for executing respective applications. The monitoring system includes a protocol which maps event data representing operations in a user space of the computing system to event data representing operations in a kernel space of the computing system. Event data specifies a thread that is executing to perform the operations, and provides context as to how the application or operating system is operating when the operations occur. The mapping provides flexibility for monitoring operations by providing performance data that is integrated across different applications and that provides additional context to event data reported from individual applications, as subsequently described. For example, the performance data enables identification of faults, errors, security flags, or performance issues in the network of computing systems that is independent of which specific application is executing on a given computing system. In addition, the event data representing the performance of an application is enriched with events data from the kernel space of the computing system executing the application.

The monitoring system is configured to monitor operations performed in a kernel space of the computing system. The operations represent execution of computing threads by an operating system for data stored in a kernel space. The kernel space includes an execution environment based a separate area of memory of the computing system. This area of memory is protected from access by application software or another non-critical portions of the operating system. Generally, the kernel space is separated from a user space to provide memory protection and hardware protection from malicious or errant software behavior. The threads in the kernel space include low-level operations controlling functionality of the computing system such as interactions between hardware and software components of the computing system. Generally, kernel space is reserved for running a privileged operating system kernel, kernel extensions, and device drivers. The kernel space can include sandboxed applications that run within virtual machines (VMs) inside an operating system, such as using the Extended Berkeley Packet Filter (eBPF) specification.

The monitoring system is configured to monitor operations performed in a user space of the computing system. The user space generally includes an execution environment outside the kernel space in which code is executed for applications and other software. For example, threads in the user space can include software that performs input or output, software that manipulates file system objects, application software, and so forth.

The monitoring system is configured to map event data from an execution thread of the user space to an event that occurs in the kernel space. The monitoring system associates an operation in the application with a corresponding operation by the operating system responsive to the application operation or causing the application operation. The monitoring system can determine which thread in the user space caused an event to occur in the kernel space. The monitoring system can determine which thread in the kernel space caused an event to occur in the user space.

The monitoring system maps the event data of the user space to the event data of the kernel space using a protocol that associates each item of event data with an index value (e.g., a unique identifier). A protocol includes a standard set of rules that define the mapping between the user space and the kernel space. The monitoring system, when an event occurs in the kernel space, accesses particular memory location, specified by the protocol, that stores the index value of the event data specifying which thread was executing when the event occurred in the kernel space. For each event in the kernel space, the protocol specifies a particular memory location that stores the index value (e.g., a thread identifier) for the event data (of the application) that is associated with that event in the kernel space. Similarly, for each event in the user space, the protocol specifies a particular memory location that stores the index value (e.g., a thread identifier) for the event data (of the operating system) that is associated with that event in the user space. As subsequently described, the protocol, depending on the particular implementation, associates the thread executing in the user space with event data in the kernel space. The association can be based on the value of the thread identifier (or another identifier already associated with the thread), values of data in the event data or executing thread, scheduling data, or other values available to the monitoring system. The particular protocol specifies which values are used to represent each of the thread or event data and how those values associate the thread and event data to one another. Examples include using system call values, service identifiers (e.g., from traced functions) and User-Level Dynamic Tracing (USTD), predefined register values in the user space, and values retrieved from task schedulers. Details of these and other examples of protocols are provided throughout this document.

Implementations of the subject matter described herein can provide various technical benefits. The monitoring system is able to determine a context for events occurring in the kernel space by associating these events with a thread executing in the user space. Generally, accessing event data for the kernel space is difficult because there are restrictions on what data are accessible to the monitoring system. The restrictions can exist to maintain security of the kernel space. To access the event data of the kernel space, the monitoring system may rely on data that are exported from the kernel space in reports. These reports result in data that are limited in scope. The reports provide less context as to what thread is executing in the user space when events (e.g., security events) occur in the kernel space because they are not associated with user space activity. Additionally, these reports may include data describing kernel execution or events data that are not of interest, increasing bandwidth overhead for monitoring and observability.

To overcome these limitations, the monitoring system maps the event data of the kernel space to the thread identifier for a thread executing in the user space. A protocol establishes the mapping by specifying a particular location in memory for storing the thread identifier (e.g., for a thread executing in the user space) that is associated with event data generated for an event in the kernel space. The mapping enables the monitoring system to combine system call filtering, network-level filtering, and process context tracing processes. The mapping provides a combined visibility into the runtime behavior of applications and the kernel system for troubleshooting performance problems of a computing system. The mapping enables the monitoring system to generate, from the kernel event data, statistical data structures (e.g., profiling) to extract meaningful visibility data.

The mapping further enables collection and in-kernel aggregation of performance metrics and generation of visibility events based on different sources. The monitoring system extends a depth of visibility for kernel events and reduces the overall system overhead by only collecting the visibility data required and by generating histograms and similar data structures at the source of the event instead of relying on the export of samples, as described previously. In an example, if a kernel event is flagged as malicious (e.g., a security issue is detected), the monitoring system is able to determine the operation occurring in the application or service that caused the kernel event to occur.

The above advantages are enabled by one or more of the following implementations.

In a general aspect, a process is for monitoring operations of a computing device by associating threads executing in a user space with kernel events in a kernel space. The process includes detecting a kernel event in the kernel space of the computing device; in response to detecting the kernel event, accessing, from a mapping table that maps a computing thread in the user space to a span that is active on the computing thread, a base address of a memory in the user space of the computing device, the memory storing a span identifier for each span in the user space, the span including one or more operations of a computing thread that is active in the user space; accessing, based on the base address, a span identifier in the memory; and associating the span identifier with the kernel event.

In some implementations, the process includes configuring the mapping table by performing, in the user space, a remote procedure call to the kernel space of the computing device, the remote procedure call storing the base address of the mapping table. In some implementations, the remote procedure call stores a value of a maximum number of threads for monitoring, where the mapping table stores the value of a maximum number of threads for monitoring, and where accessing the span identifier in the memory is based on the value of a maximum number of threads for monitoring.

In some implementations, configuring the memory includes determining an allocated size of the memory; determining a length in memory of the span identifier and a trace identifier of a trace associated with the span; and determining the value of the maximum number of threads for monitoring based on a ratio of the allocated size and the length.

In some implementations, the memory has a predefined virtual address in the user space. In some implementations, the kernel space comprises a virtual machine configured to execute at least one program in an operating system of the computing device. In some implementations, the virtual machine is based on an Extended Berkeley Packet Filter (eBPF) specification. In some implementations, the kernel event comprises a security event. Accessing the mapping table comprises executing a kernel helper function.

In a general aspect, a process is for monitoring operations of a computing device by associating threads executing in a user space with kernel events in a kernel space. The process includes detecting a kernel event in the kernel space of the computing device; obtaining a process identifier or thread identifier for a process or thread that triggered the kernel event; accessing, from a first mapping table that maps the process identifier to coroutine context data, coroutine context data that specifies scheduler data for the process or thread that triggered the kernel event; accessing a second mapping table that maps coroutine identifiers to the process identifier to obtain a coroutine identifier of a coroutine associated with the process or the thread; combining, into a key value based on the scheduler data, the coroutine identifier with the process identifier or thread identifier; accessing, using the key value, a third mapping table mapping the process or the thread to at least one of a span identifier and a trace identifier to obtain at least one of the span identifier and the trace identifier associated with the process or the thread; and associating the kernel event with at least one of the span identifier and the trace identifier.

In some implementations, the process includes obtaining a security token, from the second mapping table, associated with the process or the thread; and validating the security token by matching the security token to a second token stored in the kernel space. In some implementations, the process includes performing a function call path signatures check of a stack trace associated with the process or the thread; and validating the span identifier or trace identifier based on the function call path signatures check. In some implementations, the kernel space comprises a virtual machine configured to execute at least one program in an operating system of the computing device. In some implementations, the virtual machine is based on an Extended Berkeley Packet Filter (eBPF) specification. In some implementations, the kernel event comprises a security event. In some implementations, accessing the first, second, or third mapping tables comprises executing a kernel helper function.

In a general aspect, system includes at least one processor; and a memory storing instructions that, when executed by the at least one processor, cause the at least one processor to perform the operations of the process described herein. For example, the operation include: detecting a kernel event in the kernel space of the computing device; in response to detecting the kernel event, accessing, from a mapping table that maps a computing thread in the user space to a span that is active on the computing thread, a base address of a memory in the user space of the computing device, the memory storing a span identifier for each span in the user space, the span including one or more operations of a computing thread that is active in the user space; accessing, based on the base address, a span identifier in the memory; and associating the span identifier with the kernel event.

In some implementations, the operations further including: configuring the mapping table by performing, in the user space, a remote procedure call to the kernel space of the computing device, the remote procedure call storing the base address of the mapping table, where the remote procedure call stores a value of a maximum number of threads for monitoring, where the mapping table stores the value of a maximum number of threads for monitoring, and where accessing the span identifier in the memory is based on the value of a maximum number of threads for monitoring.

In a general aspect, the system is configured for detecting a kernel event in the kernel space of the computing device; obtaining a process identifier or thread identifier for a process or thread that triggered the kernel event; accessing, from a first mapping table that maps the process identifier to coroutine context data, coroutine context data that specifies scheduler data for the process or thread that triggered the kernel event; accessing a second mapping table that maps coroutine identifiers to the process identifier to obtain a coroutine identifier of a coroutine associated with the process or the thread; combining, into a key value based on the scheduler data, the coroutine identifier with the process identifier or thread identifier; accessing, using the key value, a third mapping table mapping the process or the thread to at least one of a span identifier and a trace identifier to obtain at least one of the span identifier and the trace identifier associated with the process or the thread; and associating the kernel event with at least one of the span identifier and the trace identifier.

In some implementations, the operations include obtaining a security token, from the second mapping table, associated with the process or the thread; and validating the security token by matching the security token to a second token stored in the kernel space. In some implementations, the process includes performing a function call path signatures check of a stack trace associated with the process or the thread; and validating the span identifier or trace identifier based on the function call path signatures check. In some implementations, the kernel space comprises a virtual machine configured to execute at least one program in an operating system of the computing device.

In a general aspect, one or more non-transitory computer readable media store instructions for monitoring operations of a computing device. The instructions, when executed by at least one processor, are configured to cause the at least one processor to perform operations including: detecting a kernel event in the kernel space of the computing device; in response to detecting the kernel event, accessing, from a mapping table that maps a computing thread in the user space to a span that is active on the computing thread, a base address of a memory in the user space of the computing device, the memory storing a span identifier for each span in the user space, the span including one or more operations of a computing thread that is active in the user space; accessing, based on the base address, a span identifier in the memory; and associating the span identifier with the kernel event.

In some implementations, the operations further including: configuring the mapping table by performing, in the user space, a remote procedure call to the kernel space of the computing device, the remote procedure call storing the base address of the mapping table, where the remote procedure call stores a value of a maximum number of threads for monitoring, where the mapping table stores the value of a maximum number of threads for monitoring, and where accessing the span identifier in the memory is based on the value of a maximum number of threads for monitoring.

The process includes detecting a kernel event in the kernel space of the computing device; obtaining a process identifier or thread identifier for a process or thread that triggered the kernel event; accessing, from a first mapping table that maps the process identifier to coroutine context data, coroutine context data that specifies scheduler data for the process or thread that triggered the kernel event; accessing a second mapping table that maps coroutine identifiers to the process identifier to obtain a coroutine identifier of a coroutine associated with the process or the thread; combining, into a key value based on the scheduler data, the coroutine identifier with the process identifier or thread identifier; accessing, using the key value, a third mapping table mapping the process or the thread to at least one of a span identifier and a trace identifier to obtain at least one of the span identifier and the trace identifier associated with the process or the thread; and associating the kernel event with at least one of the span identifier and the trace identifier.

In some implementations, the one or more non-transitory computer readable media are configured for obtaining a security token, from the second mapping table, associated with the process or the thread; and validating the security token by matching the security token to a second token stored in the kernel space. In some implementations, the process includes performing a function call path signatures check of a stack trace associated with the process or the thread; and validating the span identifier or trace identifier based on the function call path signatures check. In some implementations, the kernel space comprises a virtual machine configured to execute at least one program in an operating system of the computing device.

The details of one or more embodiments are set forth in the accompanying drawings and the description below. Other features and advantages will be apparent from the description and drawings, and from the claims.

DETAILED DESCRIPTION

Figure 1:
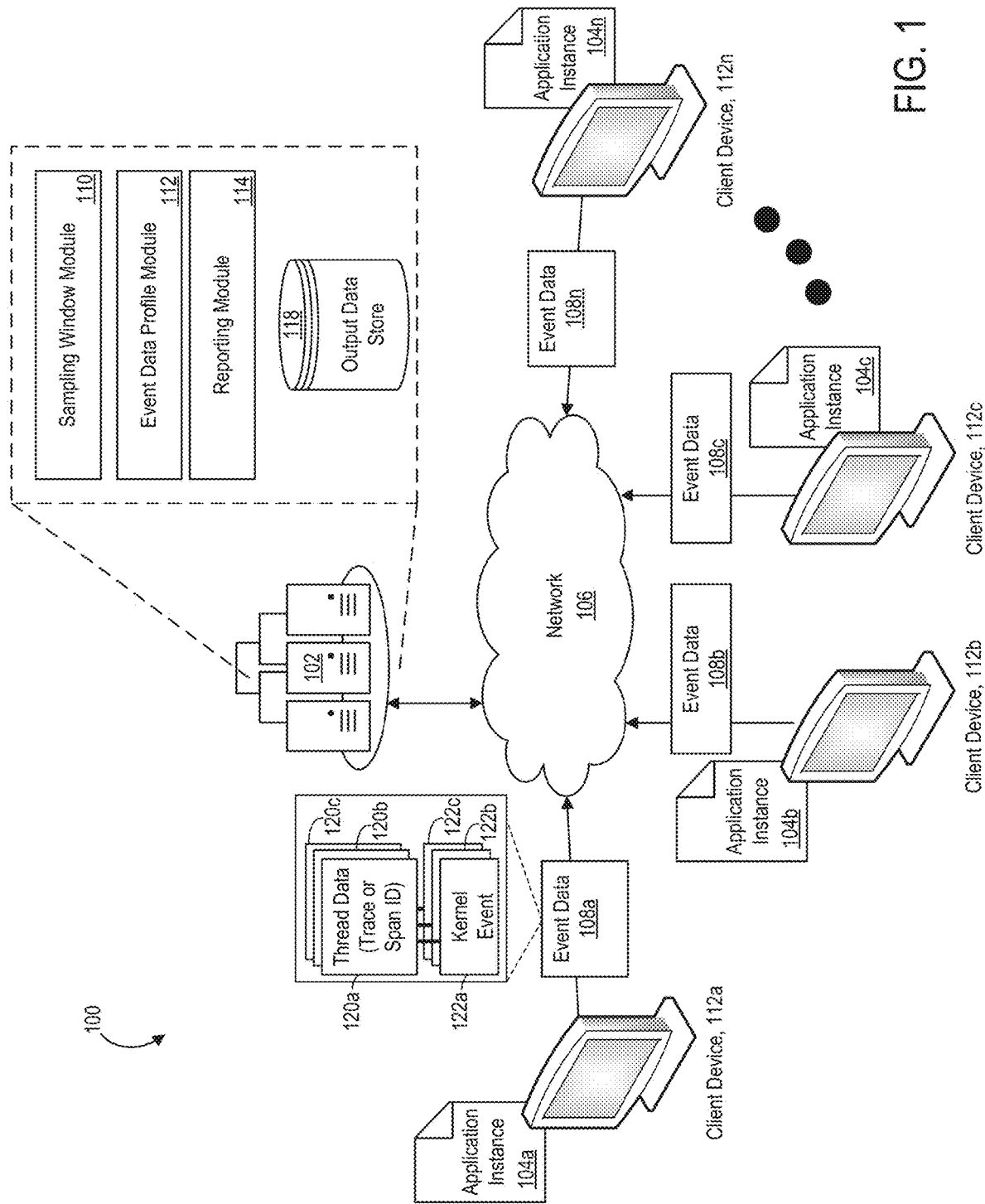
FIG. 1 is a diagram illustrating an example computing environment for a monitoring system that uses a protocol for correlating user space data with kernel space data.

FIG. 1 is a diagram of an example computing environment 100 for a monitoring system 102 that uses a protocol for correlating user space data with kernel space data for one or more client devices 112a-n. The client devices 112a-n are configured for executing respective instances 104a-n of an application 104 (e.g., monitoring an application execution thread). The protocol maps event data (e.g., a thread identifier) representing operations in a user space of the computing system (e.g., a client device 112) to event data representing operations in a kernel space of the computing system. The mapping provides flexibility for monitoring operations by providing performance data that is integrated across different applications 104a-n and that provides additional context to event data reported from individual applications.

The monitoring system 102 is configured to monitor performance of the client devices 112a-n with a controlled (e.g., constant or nearly constant) data rate consumed for the monitoring operations. The data rate includes a computing bandwidth representing a portion of the computing resources available to the monitoring system 102 and the one or more client devices 112a-n. As previously stated, computing bandwidth refers to the available processing of the system that is available to perform processing operations, and can be measured in computing cycles (e.g., processing time) or a similar metric. The computing bandwidth used for monitoring is also called a performance monitoring overhead.

The monitoring system 102 is configured to monitor how the client devices 112a-n are operating at a high scale. For example, there can be hundreds, thousands, tens of thousands, or millions of monitored operations for the client devices 112a-n by the monitoring system 102. As such, even a small optimization (e.g., a reduction in processing time or bandwidth usage) by the monitoring system 102 for monitoring a single operation results in a comparatively large reduction in consumption of computing resources for the monitoring system at scale. Therefore, the monitoring system 102 can overcome practical limitations in available bandwidth overhead in the high-scale computing environment 100 by optimizing monitoring of individual operations. As described in this document, the monitoring system 102 executes one or more protocols for associating event data in a kernel space of a client device with a thread executing in the user space of the client device in process that is feasible for the high scale environment 100.

The client devices 112a-n are each configured to execute respective application instances 104a-n. The application instances 104a-n can be software programs that are configured to perform any computing purpose monitoring system 102. For example, client devices 112a-n, by the application instances 104a-n, can be configured to host websites, data farms, cloud computing functionality, or any such purpose. The application instances 104a-n can be identical or different from one another. The client devices 112a-n can operate independently from one another or can operate together and send data to and from one another over the network 106.

The one or more client systems 112a-n are generally distributed over a computing network 106, each executing one or more instances 104a-n of the application 104. The monitoring system 102 generally includes a data processing system configured to communicate with the client systems 112a-n on the network 106. The monitoring system 102 is configured to monitor how the application instances 104a-n are executing by tracking execution events (e.g., exceptions) that are generated by the client devices 112a-n and reported to the monitoring system over the network 106.

The monitoring system 102 is configured to receive event data 108a-n from the client devices 112a-n. Generally, the event data 108a-n are generated by the one or more client devices 112a-n based on the respective instances 104a-n of the application during execution and can be reported in real time (e.g., when generated) to the monitoring system 102. The event data 108a-n include kernel events 122a-n (e.g., kernel event data) representing events that occur in the kernel space of a given client device 112a-n and respective thread data 120a-n (such as a trace ID, span ID, etc.) for the thread executing in the user space of the client device when the kernel events 122 each occur. A trace includes a collection of operations that represents a unique transaction handled by an application and its constituent services. A span represents a single operation within a trace.

The client devices 112a-n are configured to associate the thread data 120a-n (collectively thread data 120) and kernel event data 122a-n (collectively kernel events 122) for reporting to the monitoring system 102. The associations between the thread data 120 and kernel events 122 are determined based on remote procedure calls (RPC) to the kernel space. A remote procedure call (RPC) includes an instruction for a procedure (e.g., a subroutine in the user space) to execute in a different address space (e.g., the kernel space of the client device 112a-n), and the instruction is coded as if it were a local procedure call. RPCs enable form of inter-process communication (IPC) where different processes have different address spaces. The RPC allows the client device 112a-n to extract data from its kernel space without disrupting operations executing in the kernel space. The client device 112a-n reports the event data 108a-n including the kernel event 122 and the associated thread data 120 to each kernel event.

The thread data 120 include respective stack traces, span identifiers, coroutine identifiers, etc. that each illustrate how an application instance 104a-n is executing in the user space. In some implementations, the stack traces of the thread data 120 show a series of operations or actions performed by the application that caused a kernel event 122 to occur. The thread data 120 include metadata such as coroutine context data specifying circumstances of the event data generation including dispatcher data and job data. The dispatcher data specifies how a dispatcher module is controlling the client device 112 to execute a process selected by a scheduler (e.g., a short-term scheduler that schedules thread execution). For example, the dispatcher receives control in kernel mode as the result of an interrupt or system call. The dispatcher performs context switches, in which the dispatcher saves the state (also known as context) of the process or thread that was previously running. The dispatcher loads the initial or previously saved state of the new process. The dispatcher performs switching to user mode in which the thread jumps to the location in the user program to restart that program indicated by the new state of the program. The coroutine context data therefore describe thread execution control for the client device 112.

The monitoring system 102 is configured to generate a summary of the events (e.g., kernel events 122 and their associated thread data 120) using an event data profile module 112. The summary generally profiles the event data 108a-n and includes a subset of the event data 108a-n in addition to other data generated from the profile of the events data. For example, the profile module 112 of the monitoring system 102 can generate a statistical summary of the events data and generate on or more reports including the summary. Generating a profile can include generating summary data representing the events. The summary generally includes a representation of the events without including all the data of the application events. For example, the profile can include a statistical summary of the events and additional data that together provide a representation of events that are being generated by the one or more application instances. For example, the summary can include a representation of how many times each different type of event is generated, a frequency associated with generating the events from each client device 112a-n or from a group of the client devices, a rate of receiving the events over a period of time, comparisons of events generation to historical levels (e.g., a historical average), and so forth. This summary can be used by the profile module 112 to determine how the application instances 104a-n are executing, and whether there are any issues for execution of the application instances. In an example, the monitoring system 102 generates additional data including metadata associated with the events data or portions of the events data.

A reporting module 114 of the monitoring system 102 is configured to generate reports that include the profile data. The type of report generated can be specified by a user or another computing system depending on how the profile data are being used. For example, output data generated by the reporting module 114 can include a histogram of which exceptions were generated their types and counts for each type. In other examples, subsequently described, visualizations such as line graphs, tables, or other outputs are generated. These can be continuously or intermittently updated as sampling continuous on an ongoing basis along with reporting.

The output data can be stored in an output data store 118 and used for one or more other purposes. For example, the results can be sent to a monitoring dashboard in real time or near real time. Here, real time includes a processing of data as its received and immediate output of that data without delaying, in which any latency is generally caused by the processing of the data (rather than internally storing any data for batch processing). Real time or near real time indicators can show how many exceptions are being generated per second and their types. Various alerts, alarms, etc. can be set for triggering in response to particular results of the profile data. For example, particular exceptions exceeding given threshold values can cause alarms or alerts to be generated and sent to an operator of the networked computing system. Other similar reporting applications are possible.

As described above, the monitoring system 102 is communicatively connected to the client devices 112a-n and the computing system 102 through a network 106. The monitoring system 102 can include, but are not limited to, e.g., one or more server computers. The monitoring system 102 can be configured to transmit, receive, and/or process data. For instance, in some cases, the monitoring system 102 can be a web server configured to receive and store content (e.g., web content, such as a web page), and make the content available to one or more other computer systems (e.g., client devices 112a-n). Upon receiving a request (e.g., from the client devices 112a-n), the monitoring system 102 can retrieve the requested content and transmit the content to the requesting computer system to fulfill the request. In some cases, the monitoring system 102 can be owned, operated, and/or maintained by parties different from those that own, operate, and/or maintain the computing system 102.

Each of the client devices 112a-n can include a respective user interface. Users can interact with the user interface to view content of the application instances 104a-n. Users can also interact with the user interface to transmit data to other devices (e.g., to the monitoring system 102). Users can interact with the user interface to issue commands (e.g., to the monitoring system 102). In some implementations, a user can install a software application onto a client devices 112a-n in order to facilitate performance of these tasks.

In some implementations, one or more functions of the monitoring system 102 are performed locally by the respective client devices 112a-n. For example, the monitoring system 102 specifies the protocol for correlating application event data with kernel space event data to a client devices 112a-n. The client devices 112a-n each associate user space data with kernel data locally and report the results to the monitoring system 102 for global analysis, reporting, fault detection, etc. In some implementations, the monitoring system 102 is hosted entirely by one of the client devices 112a-n.

The client devices 112a-n can include any electronic device that is used by a user to view, process, transmit and receive data. Examples of the client devices 112a-n include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client devices 112a-n can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, the client devices 112a-n need not be located locally with respect to the rest of the environment 100, and can be located in one or more remote physical locations.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The monitoring system 102 is illustrated as a respective single component. However, in practice, each can be implemented on one or more computing devices. In some implementations, the monitoring system 102 can include multiple computing devices that are connected to the network 106. The monitoring system 102 can alternatively be a single computing device that is connected to the network 106. In some implementations, the monitoring system 102 need not be located locally to the rest of the environment 100, and portions of the monitoring system 102 can be can be located in one or more remote physical locations from the client devices 112a-n.

Figure 2A:
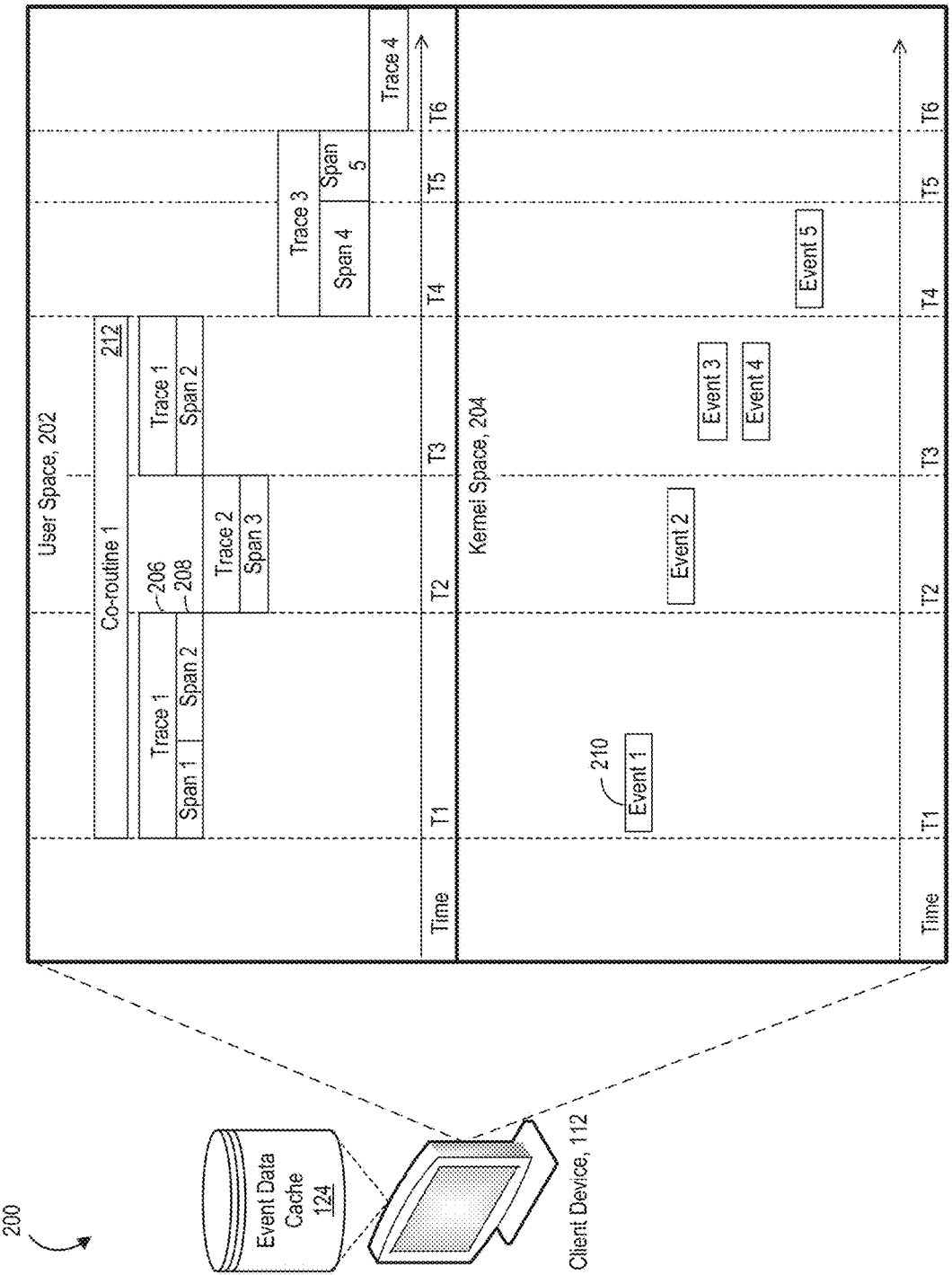
FIG. 2A shows a visualization of a user space including executing threads and a kernel space including events.

FIG. 2A shows a visualization of a client device 112, such as one of the client devices 112a-n of FIG. 1. The client device 112 includes a user space 202 and a kernel space 204. The user space 202 includes the space in the client device 112 in which user processes are run. The kernel space 204, as previously described, includes a space in the client device 112 in which system operations of the kernel are run. The user space 202 and the kernel space 204 are visualized as parallel timelines over time periods T1, T2, T3, T4, T5, and T6. Though discrete time periods are shown for illustrative purposes, the client device 112 does not necessarily assign time stamps to each trace 206, span 208, event 210, or coroutine 212. Additionally, kernel events 210 in the same time period as an executing coroutine, trace or span of a thread in the user space are not necessarily associated with that thread in the user space. For example, while it is possible that Event 1 is caused by one or more operations in Trace 2/Span 3 of Coroutine 1, it is not a guarantee that Event 1 is caused by operations of that thread. For example, Event 1 may have been caused by an operation of Trace 1/Span 1 or Trace 1/Span 2. Thus, the client device 112 is configured to associate the thread of the user space with the related event in the kernel space using RPCs.

To associate kernel events 210 with the corresponding coroutine 212 and trace 206 or span 208 of the user space, the application of the user space 202 accesses the kernel space 204 execution environment or vice versa. There are several options for communicating with the kernel space (e.g., reading data from the kernel space) from the user space. A first option includes probing, from the user space, the kernel space by a system call. A second option includes probing, from the kernel space, a user space function call. A third option includes generating an event data indexed cache in memory (e.g., in the user space) for communal write access for each of the kernel space and user space. A process in the user space can find event data by accessing the event data cache 124 based on a protocol that specifies wherein the event data cache 124 the kernel space stores the data of the kernel event 210. Conversely, a process in the kernel space can find a span ID, trace ID, etc. for associating with a kernel event by accessing the cache at a location specified by the protocol. Each of these options is now described in greater detail.

A process operating in the user space can retrieve data from the kernel space based on a system call using tracepoints or kernel probes (Kprobes). A Kprobe is configured to create instrumentation events for any kernel function. The instrumentation monitors function callouts in the kernel and generates a trace of events with timing details. The Kprobes can providing a timing overview of kernel procedures including outputs describing where time is spent in functions and sub-routines in the kernel. The Kprobes are configured to gather instrumentation during execution of the kernel operations without needing to either reboot the system or run the kernel in a special mode. Tracepoints perform kernel static instrumentation. Tracepoints include tracing calls inserted into the kernel code at predetermined places.

The client device generates a kernel space virtual machine extension (such as eBPF) for probing kernel operations (e.g., modifying system calls). The Kprobes are typically used for tracing purposes, but the client device 112 is configured to modify how a system call behaves in the virtual machine extension of the kernel space. To modify system calls, the client device 112 can use helper functions. The helper functions (e.g., eBPF helpers) include a set of functions that are called from the virtual machine to change kernel behavior or access context about the current virtual machine program execution. The helper function bpf_override_return changes a return value of a system call (e.g., also called a syscall). If this helper is called on entry of the system call, the action requested by the system call is aborted, and the system call returns immediately. The system call is modified to provide a pointer to a cache in the user space where the virtual machine process is able to insert custom values including event identifiers.

Instrumentation in the user space (such as APM instrumentation of the monitoring system 102 of FIG. 1) invokes a predefined system call having a custom input value. The virtual machine extension of the kernel space is configured to extract data from the user space. The virtual machine extension of the kernel space answers the request of the system call either using an override return helper or accessing the cache in the user space using a pointer value specified in the input. The system call and input value are selected so that the kernel process disregards the system call regardless of the presence of an executing program. For example, the input value can include a predetermined code value that is specified in a protocol. The code value signals to the kernel space that the current system call is being used not to perform a system function, but to access the user space cache. In some implementations, the code value includes invalid system call parameter(s).

Using a system call to signal to the kernel space where to access span or trace identifiers in the cache is relatively fast in that it requires relatively low processing overhead to perform in comparison with parsing output reports provided by the kernel as previously discussed. Additionally, using the system call to signal the kernel space as described here is a universal solution that is independent of specific coding languages, architectures, and kernel binaries without any custom setup other than the monitoring system instrumentation application (APM instrumentation).

A second option for communication between the user space and kernel space includes a process in which the kernel space is configured to access data in the user space. The kernel space uses a user space probe (called a Uprobe) to access data from threads in the user space. A Uprobe is similar to a Kprobe previously described, but the Uprobe is included in user-space services. Uprobes instrument user-level function entries and user return probes (u-ret-probes) instrument return values of those functions. Uprobes are file based. When a function in an executable file is traced, the Uprobe instruments all processes using that file, including those processes that start in the future. For example, a Uprobe can trace shared library calls on a system-wide basis.

In addition to or alternatively to Uprobes, the kernel space performs dynamic user-level statically defined tracing (USDT). Dynamic USDT provides user-level dynamic instrumentation for runtimes that are not able to export data from Uprobe monitoring points (also called hook points) natively. Dynamic USDT processes load a shared library at runtime and make the monitored application call its functions from that shared library. The shared libraries are configured to export symbols on which Uprobes are attachable. Therefore, interpreted or compiled-on-the-fly languages can be monitored at hook points.

The kernel space uses Uprobes and dynamic USDT to monitor points in the processes of the user space function calls. The Uprobes and/or dynamic USDT collect function parameters, as long as the function is not an inline function and the symbol is exported. An inline function is one for which the compiler copies the code from the function definition directly into the code of the calling function rather than creating a separate set of instructions in memory. The span identifiers can be retrieved by the kernel space using a call to an exported function with the correctly specified parameters.

The use of Uprobes and dynamic USDT enables the kernel space to retrieve data from applications that cannot be easily patched. This can be performed in some cases with instrumentation on a per language version basis. In some cases, dynamic USDT hook points are configured as well. In addition, Uprobes and dynamic USDT are a file-based approach, and so a Uprobe and/or USDT is configured by a system-probe when the traced service is started.

A third option for communication between the user space and kernel space includes a process in which the kernel space is configured to access a cache established in the user space for storing thread data such as span identifiers (span IDs), trace identifiers (trace IDs), coroutine identifiers (coroutine IDs), and coroutine context data. This is called user space memory access by the kernel space. The cache stores, for each thread related to a kernel event, the thread's extended process context. The extended process context includes a set of identifiers that uniquely identifies a given execution thread. In some implementations, for languages that implement coroutines, the set of identifiers includes a process ID (PID), thread ID (TID), and coroutine ID. For other languages, (PID, TID) provide enough information to identify the thread.

For user space memory access, a virtual machine helper function (e.g., bpf_get_current_task) gives access to a kernel task structure. The kernel task structure holds references to the memory pointers of the current thread. These pointers include pointers to the current user space stack and to various segment registers. Segment registers refer to addresses in memory storing specific areas defined in a program for containing data, code and stack information. The helper function can dereference the stack (e.g., access the data or value in the memory that the pointer is referencing) to retrieve relevant information. For example, depending on the architecture, a reference to the current routine is stored in a predefined register which is accessible through task structure function (task_struct).

Accessing the memory using the helper as described can be language specific, specific to the version of the language, and specific to an architecture on which the program is executing. Therefore, rather than relying on the context data of the thread to guess where to read from the stack memory, the client device 112 is configured to maintain the specific event data cache 124 in the user space. The event data cache is described in further detail in relation to FIG. 3.

The monitoring system 102 instrumentation maintains the event data cache 124 in the user space which is up-to-date with the spans currently active on each thread. A protocol of the monitoring system 102 instrumentation indicates to the kernel space (e.g., the virtual machine running programs in the kernel space) how to read the event data cache 124. This approach is fast (as previously described), minimizing monitoring overhead. The event data cache 124 minimizes context switches and the amount of time the user space application has to reach out to our kernel space virtual machine programs.

Figure 2B:
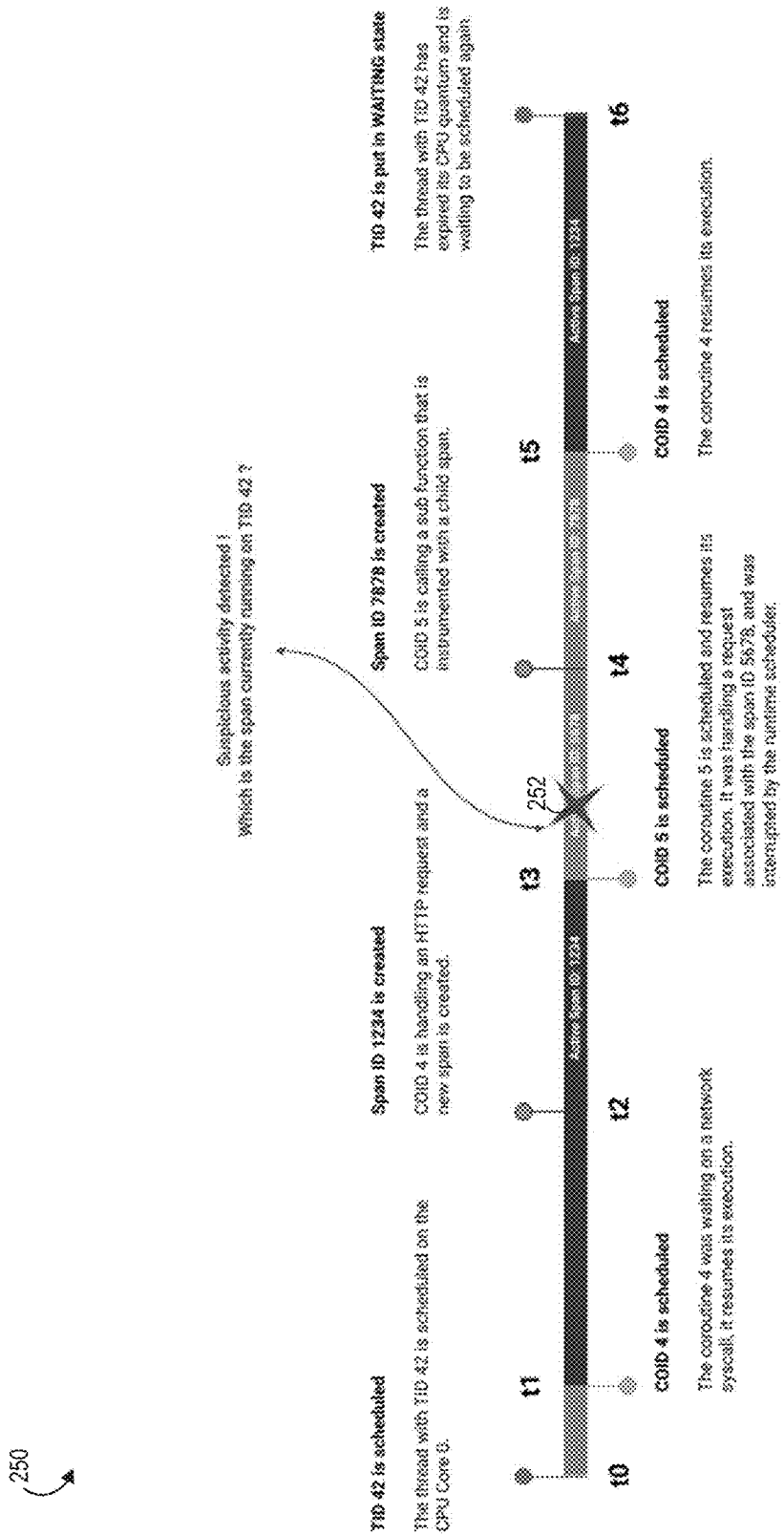
FIG. 2B is an illustration of a timeline of scheduled coroutines described in relation to FIG. 2A.
Figure 3A:
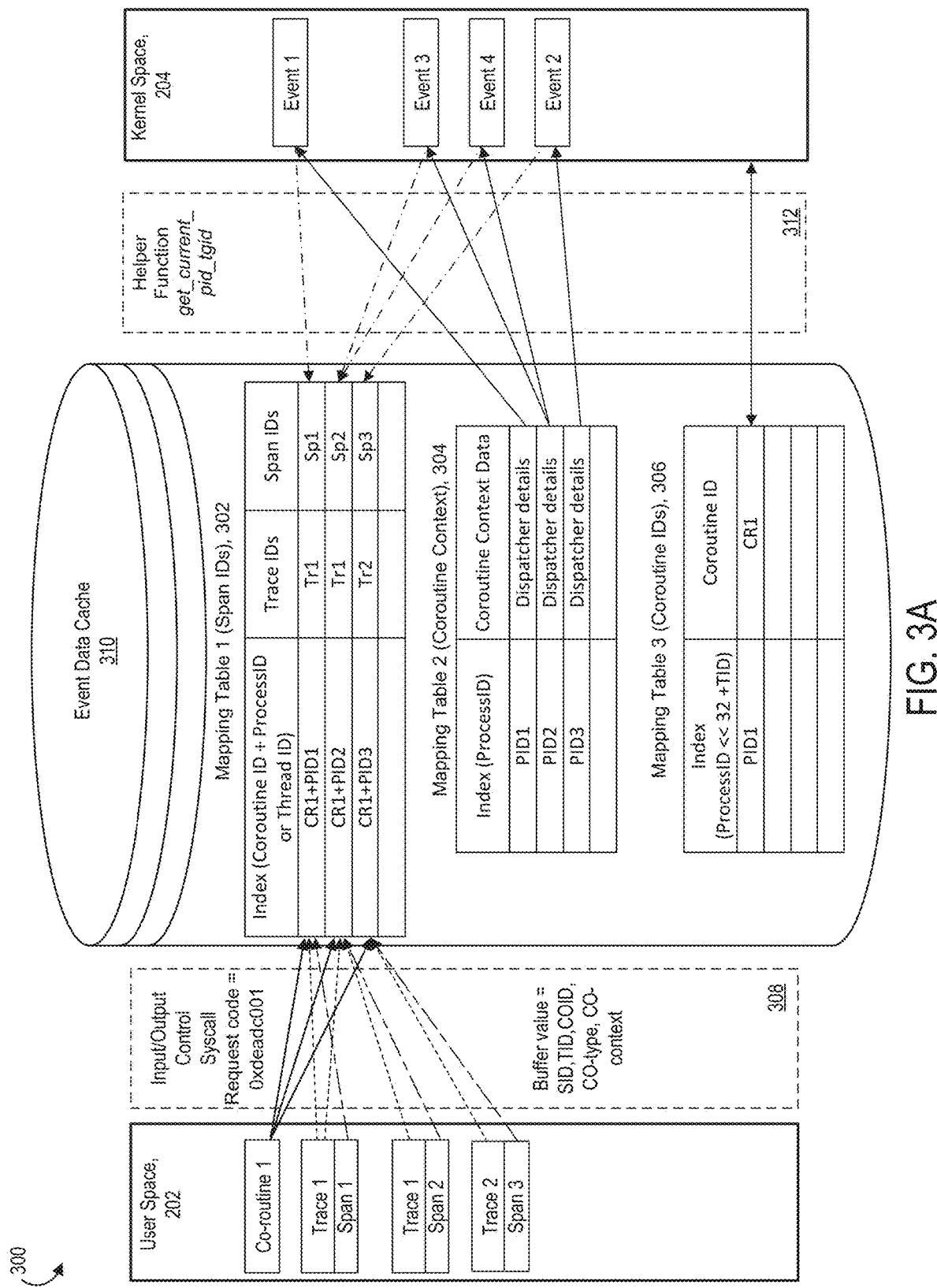
FIG. 3A is an illustration of the event data cache of the example user space and kernel space of FIGS. 2A-2B.

FIG. 2B is an illustration of a timeline 250 of scheduled coroutines (e.g., on client device 112). The timeline 250 illustrates a scenario in which, when a kernel event is detected at time t3, the client device 112 determines which span is executing on trace ID 42. Because coroutines are being scheduled dynamically, including coroutine 4 at time t1 and coroutine 5 at time t3, the particular span that caused the suspicious event 252 on timeline 250 is not directly apparent to the kernel space. The active span 5678 of time t3 may not be the span that caused the suspicious event 252 to occur. The kernel space communicates with the user space to determine which span is associated with events in the kernel space FIG. 3A is an illustration of an environment 300 including an event data cache 310. Cache 310 is similar to the cache 310 of the example user space 202 and kernel space 204 of FIGS. 2A and 2B. The processes used for updating the event data cache 310 and reading data from the event data cache 124 are described in further detail with respect to FIGS. 4-9.

The user space event data cache 124, as previously described, includes memory that is set aside in the user space for storing mapping tables that associate span IDs and/or trace IDs for operations occurring in the user space with events data from the kernel space. The mapping tables include a span IDs table 302, a coroutine context table 304, and a coroutine IDs table 306. Each of mapping tables 302, 304, and 306 can be hash tables in which each index value is a hash function of one of the identifiers of the extended process context. For example, the index values for the span IDs table 302 can include hashed outputs of the coroutine ID+the PID or TID for a span. The span IDs mapping table 302 can store TIDs and span IDs (SIDs) with the hashed index values. The coroutine context mapping table 304 includes indexes that are hashed values of the PIDs for indexing coroutine context data. The coroutine IDs mapping table 306 uses PIDs<<32+TID values as the indexes and stores, in each entry, a coroutine ID.

The cache 310 is used by the client device 112 to associate the kernel event data with a span ID and/or trace ID using RPCs for the virtual machine (e.g., an eBPF) in the kernel space. The arrows of FIG. 3A show read/write requests to the cache 310 for a system call overloading process. A communication protocol enables communication between a monitoring application (e.g., an APM tracer) and the virtual machine program hosting kernel probes.

The application, executing in the user space 202, is configured to declare a span scheduling event for each span being executed (e.g., span 1, span 2, span 3, etc.). The application uses, in a deterministic manner, the extended process context for a span to identify that span. As previously described, the RPC includes the span ID, trace ID, and other identifiers. For the system call overloading process an input/output control system call (e.g., ioctl syscall) is configured. In some implementations, the protocol specifies that the system call has the following parameters. A file descriptor value is set to 0. A request code value is set to a predetermined value that uniquely identifies the system call as being an RPC request. This value, for example, is 0xdeadc001. The APM tracer application generates a pointer to a buffer (e.g., of 257 bytes). The pointer includes an OP code of 1 byte. In some implementations, the OP code specifies SPAN_ID_OP=3. The buffer (e.g., of 256 bytes) includes the RPC data. Specifically, the buffer includes a secret token (e.g., 8 bytes) for security, as subsequently described. The buffer includes the span ID (e.g., 8 bytes). The buffer includes the trace ID (e.g., 8 bytes). The buffer includes the coroutine ID (e.g., 8 bytes if included or 0 bytes if there is no coroutine). The buffer includes a coroutine context type (e.g., 1 byte). The buffer includes custom coroutine context data (e.g., up to 223 bytes).

In some implementations, the application instrumentation uses a particular system call for adding the Kprobe in the kernel space. In some implementations, the ioctl system call is used. The ioctl system call provides a kernel space interface to extract the different parameter values and the user space buffer. In some implementations, the ioctl system call is not heavily used in typical production environments, which minimizes an impact of adding a Kprobe on to the system call. However, other system calls can be used.

In the kernel space, a Kprobe on the chosen system call 308 (e.g., ioctl syscall) parses a request and stores the span ID and trace ID in the buffer in the Span IDs mapping table 302 (e.g., a Least Recently Used (LRU) hash map). The mapping table 302 is indexed by the coroutine ID and, depending on the language defined by the coroutine context type, the Thread ID or the Process ID, as previously described. Coroutine context type and data are stored in the coroutine context mapping table 304. Mapping table 304 is indexed by the PID of the process. The various system-probe kernel programs in the kernel space 204 ensure that the coroutine context is inherited by a child process after a fork. If a coroutine is provided, the kernel process marks the coroutine as the currently active coroutine on a thread by storing its ID in the coroutine IDs mapping table 306 (e.g., a LRU hash map), indexed by PID<<32+TID.

In some implementations, the system call is again made by the application instrumentation when a span finishes operations. A difference from the previous arguments of the system call is that instead of providing the span ID of the span, a parent ID (if it exists) is provided. If no parent exists, a value of 0 is provided for both the span ID and the trace ID.

The client device 112 declares coroutine scheduling events. Multiple coroutines can be scheduled successively on the same thread. The coroutines mapping table 306 is updated whenever a new coroutine is scheduled on a thread. Because additional coroutines can be added relatively frequently, the use of one of the relatively faster options (e.g., other than the system call) are generally used by the client device 112 to update the mapping table 306. The alternative options, as previously described, include the Uprobe or dynamic UDST. Generally, a Uprobe or USDT process explicitly updates the mapping table 306.

The client device 112 is configured to match kernel events with spans using the helper function 312 (e.g., the bpf_get_current_pid_tgid helper). The kernel space 204 virtual machine program has access to the current process ID and thread ID that triggered a network event or runtime security event. From this initial process context, the following steps are taken to match the span. The coroutine context is selected from the coroutine context mapping table 304 using the PID of the process, as shown in FIG. 3A. The coroutine ID is selected from the coroutine IDs mapping table 306, using the PID<<32+TID key. If the current process does not use coroutines, the default value of 0 is used for future map lookups. Based on the coroutine context, either the PID or the TID is combined with the coroutine ID. The program in the virtual machine uses the combined PID or TID and COID to query the mapping table 302, thus retrieving the span ID and trace ID.

There are security considerations for accessing the kernel space 204 using the RPC. The client device 112 is configured to ensure that an attacker who compromised a service cannot easily alter the resolved span ID. To prevent an attacker who is aware of this interface from declaring a fake span to override the context tracked in kernel space, the client device 112 is configured to detect legitimate RPC calls from malicious ones. The client device 112 is configured to perform function call path signatures checking or secret tokens checking to validate legitimate PRC calls.

In some implementations, the kernel space 204 virtual machine program is configured to perform the function call path signatures check. The kernel space 204 program has multiple helpers that can be used to inspect the user space 202 stack trace that made the system call (e.g., ioctl syscall). The kernel space program uses the stack trace to make sure that only specific call flows within the instrumentation application can declare a new span ID. Specifically, the client device 112 only commits span ID events that are made by the APM instrumentation. Depending on the language, a Dynamic USDT is used to perform the check. The client device therefore uses address space layout randomization (ASLR) to hide addresses of functions that are permitted to make the RPC system call. Validating that the function call is from the application instrumentation ensures that only instrumented spans can submit span IDs through the RPC system call. This ensures that an attacker cannot guess the function address to initiate the system call. The attacker may generate a new span, but the call flow would fail this validation.

In an example, the validation checks a call path signature that includes the four latest (or more) user space nodes of the user space stack trace. These enable the kernel to differentiate legitimate RPC requests from malicious ones. An example output is generated when calling a "vuln/span_altering_attempt" route of a test server:

< . . . >-791990 [001] . . . 75634.798835: 0: node2:7622039 node3:7621197 node4:7997357
< . . . >-791990 [001] . . . 75634.798840: 0: valid stack trace signature:)
< . . . >-791990 [000] . . . 75645.240310: 0: node2:7622039 node3:7621197 node4:8026565
< . . . >-791990 [000] . . . 75645.240320: 0: valid stack trace signature:)
< . . . >-791990 [000] . . . 75645.240386: 0: node2:7622039 node3:8134015 node4:7097572
< . . . >-791990 [000] . . . 75645.240386: 0: invalid stack trace signature !

In some implementations, the kernel program of the client device 112 is configured to perform secret tokens checking. The application instrumentation is configured to generate a secret random token when the first span is created. The kernel space accepts this token, and subsequently ignores future span generation requests that do not include this token. The secret token is generated and stored by the Tracer for the entire life of the service. In the kernel space, a hash map is used to store the token of each process. Span creation requests with an invalid token are rejected.

An example output of token-based verification is shown below. The following output is generated when calling a "vuln/span_altering_attempt" route of a test server:

< . . . >-1807127 [000] . . . 252203.396861: 0: provided_token:9872300279676739516
< . . . >-1807127 [000] . . . 252203.396909: 0: valid secret token:)
< . . . >-1807127 [000] . . . 252203.397008: 0: provided_token:123123
< . . . >-1807127 [000] . . . 252203.397014: 0: invalid secret token !

Figure 3B:
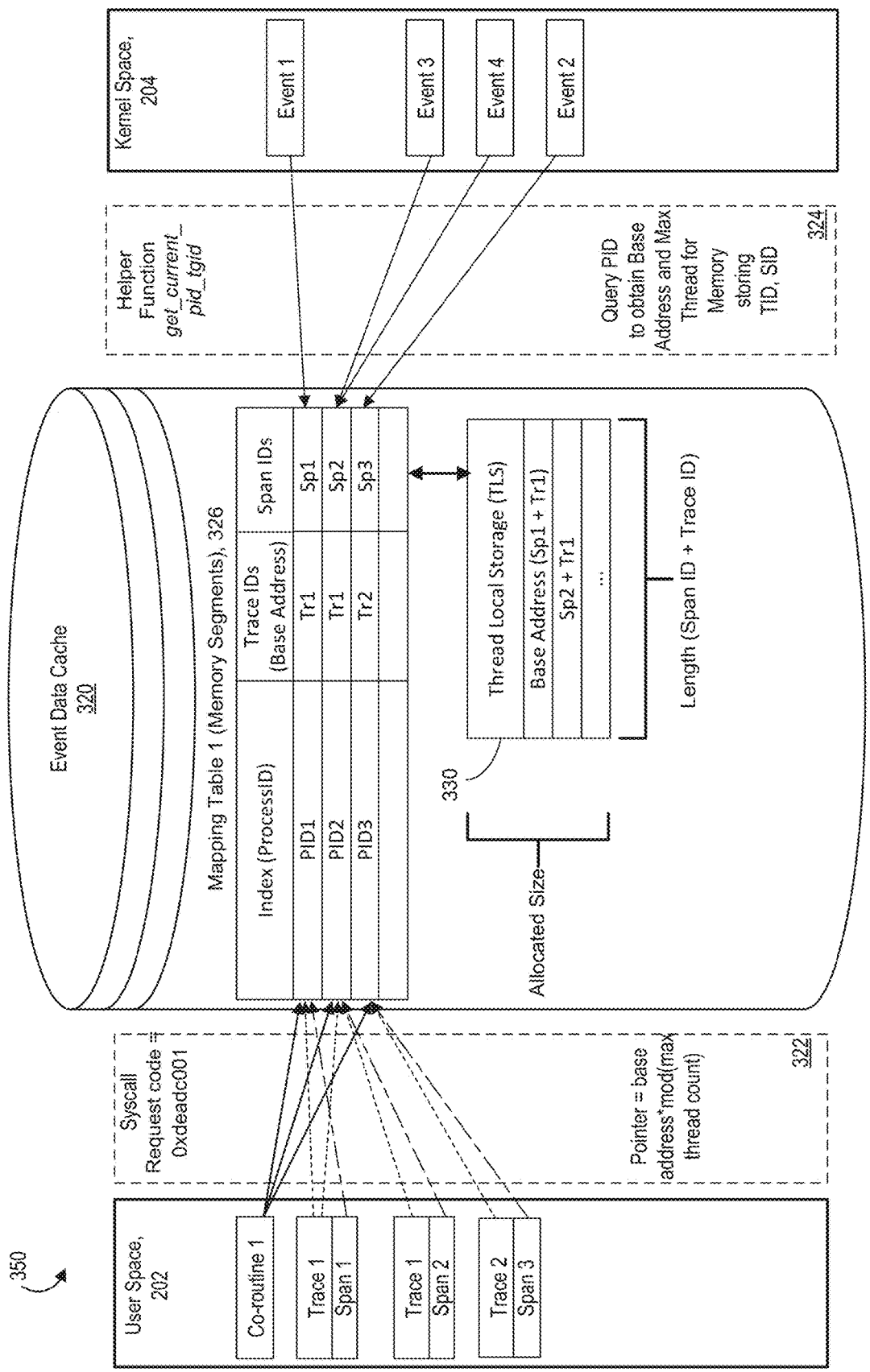
FIG. 3B is an illustration of the event data cache of the example user space and kernel space of FIGS. 2A-2B.

FIG. 3B is an illustration of an environment 350 including an event data cache 320. Cache 320 is similar to the cache 124 of the example user space 202 and kernel space 204 of FIGS. 2A and 2B. The processes used for updating the event data cache 320 and reading data from the event data cache 320 are described in further detail with respect to FIGS. 4-9. The user space event data cache 320, as previously described, includes memory that is set aside in the user space for storing mapping tables that associate span IDs and/or trace IDs for operations occurring in the user space with events data from the kernel space.

The client device 112 is configured to use a protocol for communication between the kernel space and the user space (e.g., between a monitoring system tracer and virtual machine programs executing in the kernel space). The protocol specifies the use of thread local storage 330 (TLS) and RPCs for this communication. The client device is configured to allocate memory in the user space (a thread local solution) that is accessible by the kernel virtual machine processes. The protocol is runtime agnostic so that kernel programs are compatible with the user space memory management logic of each runtime.

To configure the memory in the event data cache 230, on startup, the user space application allocates memory (e.g., a few memory pages) in a deliberate way that is outside of automated memory management subroutines. Since those pages are created deliberately (manually), they are outside of automated memory management and the virtual address is static until the end of the program. The cache 320 stores the mapping between a thread and the span that is currently active on the thread. The size of the allocated memory in the cache 320 defines a total number of concurrent threads that are tracked at the same time. The maximum number of threads is the allocated size (in bytes) divided by the length of the span ID+the trace ID (in bytes).

The user space 202 application is configured to initiate an RPC call 322 to the kernel space 204 virtual machine programs with the address of the allocated memory. The RPC call 322 includes a maximum number of threads that the user space instrumentation tracks. The parameters of that RPC call 322 include the following example parameter values. A file descriptor value is set to 0. A request code is set to a predefined signal value that indicates to the kernel space 204 process that the request is the expected RPC call 322 that is specifying the cache 320 configuration (including size and location of the cache). In some implementations, the value is 0xdeadc001. The call 322 includes a pointer to a buffer of 257 bytes. The pointer includes an OP code (e.g., 1 byte). For example, the OP code can be MEMORY_SEG-MENT_OP=5. The pointer includes the buffer (e.g., 256 bytes). The buffer includes the base address of the Thread Local Storage (TLS) buffer (8 bytes). The base address is the tls_base_addr value. The buffer includes a value of a maximum number of threads tracked in the Thread Local Storage (8 bytes). This is a modulo value for the memory equation and is called the tls_modulo.

The RPC call 322 is handled in the kernel space 204. The virtual machine process stores the base address value and maximum threads value in a mapping table 326 called a memory segments mapping table, which can be a hash map. The mapping table 326 is indexed by the process ID, as shown in FIG. 3B. The TLS 330 is used for all the threads of a thread group. When the kernel space 204 process receives a memory segment declaration request (e.g., call 322), the process writes a value (e.g., 1) to a beginning of the memory segment to signal to the tracer application in the user space 202 that the kernel program has received the cache 320 configuration and that the kernel space is ready to track span IDs. The tracer is configured to resend the request 322 periodically until a 1 is detected in the allocated memory. The memory segment declaration RPC call 322 occurs when the tracer is created. Generally, additional memory segment declarations for a given thread group are ignored. If the runtime or library uses coroutines, another cache is generated to keep track of the mapping between a coroutine ID and the span that is currently active on this coroutine (similar to mapping table 306 described in relation to FIG. 3A).

The instrumentation application handles new span creation by updating the mapping table 326. When a new span is created, the tracer updates the TLS cache 320 so that the ID of the active thread points to the newly created span. To do so, the tracer writes the active span ID and the active trace ID at the following addresses: span ID address=TLS base address+(thread ID modulo (maximum thread number))*16; the trace ID address is the TLS base address+(thread ID modulo (maximum thread number)*16+8. Collisions are possible, but if the max thread value is large, collisions are limited (e.g., if the maximum thread value is 256,000 for a 4 megabyte cache 320.

If the runtime or library uses coroutines, a second mapping table (e.g., similar to mapping table 306 of FIG. 3A) is included to match a coroutine ID with a span, and then the thread ID with the coroutine ID. This is performed in the user space so that the kernel space process ignores how the TLS cache 320 is maintained.

The TLS cache 320 is used for matching a kernel event with a span. With a helper function 324 (e.g., bpf_get_current_pid_tgid( ) eBPF helper), the kernel space 204 process has access to the process ID and the thread ID of the process that triggered a security event. The kernel process can query the mapping table 326 for the current process ID. The kernel process is able to retrieve the base address of the TLS cache 320 and the maximum thread value (tls_modulo number) used to compute the addresses at which the span ID and trace ID of a given thread are stored in the cache 320.

The client device is configured to consider TLS security. The TLS cache 320 is in the user space 202 and is shared between all the threads of a process. Therefore, a compromised thread could cause the cache to fall out of compliance with the protocol and thus no longer store span IDs and trace IDs in the specified memory addresses. To compromise the cache 320, a malicious user must guess the base address of the cache 320. Accessing the PID mapping table can be detected by a security agent.

The solutions described in relation to FIGS. 3A-3B are benchmarked to determine how much overhead is added to the monitoring system 102 operations. Examples of added overhead are shown in Table 1 to illustrate relative overhead by different operations.

When it comes to measuring overhead in kernel space, the output of the benchmark depends on the current load of the machine (and not necessarily only on the service). Results are compared to the average span generation time. The absolute values do not necessarily represent the exact execution time that will be observed in production. The amount of time (on average) required to generate a span (e.g., Benchmark-Span-Creation) is benchmarked to provide a relative value for additional operations. Table 1 below shows the average execution time of the following scenarios. Benchmark-Function-Call is when the function is called by itself for reference. Benchmark-Function-Call-With-ERPC-No-Kprobe is when the function is called after adding the ioctl system call, but there is no Kprobe on the system call yet. Benchmark-Function-Call-With-ERPC-Kprobe is when the function is called with the ioctl system call and a Kprobe was set on the system call. The eBPF program attached to the Kprobe is the one used to track the creation of a new span. Benchmark-Function-Call-With-Empty-Uprobe is when the function is called without the ioctl system call but with an empty Uprobe. Benchmark-Function-Call-With-Complex-Uprobe is when the function is called without the ioctl system call with a Uprobe. The kernel space process attached to the Uprobe is one that tracks the scheduling of a new coroutine on a thread. Note that both kernel space processes are almost identical and are comparable to one another. Benchmark-Function-With-Memory-Segment-Runtime-Execute is when the function is called with a simulation of what a runtime package instrumentation overhead is predicted to be. This is the overhead added to the runtime execution function (so that overhead is added whenever a coroutine is scheduled on a thread. Benchmark-Function-With-Memory-Segment-New-Span is when the function is called with a simulation of the overhead on the span creation with the memory segment method. This is the overhead added whenever a coroutine creates a new span.

In an embodiment, a set of kernel programs maintain a cache updated with the mapping between a Process ID a Thread ID as seen from a root namespace (returned from the bpf_get_current_pid_tgid helper function) and the Process ID and Thread ID as seen by the user space application (which is used by the monitoring system to update the user space cache). This mapping is used by the kernel space virtual machine program to compute the correct address at which the span ID and trace ID should be read. This supports containers in in the operating system. Containers can include a form of operating system virtualization. A single container might be used to run anything from a small microservice or software process to a larger application.

TABLE 1

Function Benchmarks.

| Function | Overhead (nanoseconds/ operation) |
| --- | --- |
| BenchmarkSpanCreation | 1797778 |
| BenchmarkFunctionCall | 59 |
| BenchmarkFunctionCallWithERPCNoKprobe | 908 |
| BenchmarkFunctionCallWithERPCKprobe | 1993 |
| BenchmarkFunctionWithEmptyUprobe | 3071 |
| BenchmarkFunctionWithComplexUprobe | 3469 |
| BenchmarkFunctionWithMemorySegmentRuntimeExecute | 85 |
| BenchmarkFunctionWithMemorySegmentNewSpan | 108 |

Figure 4:
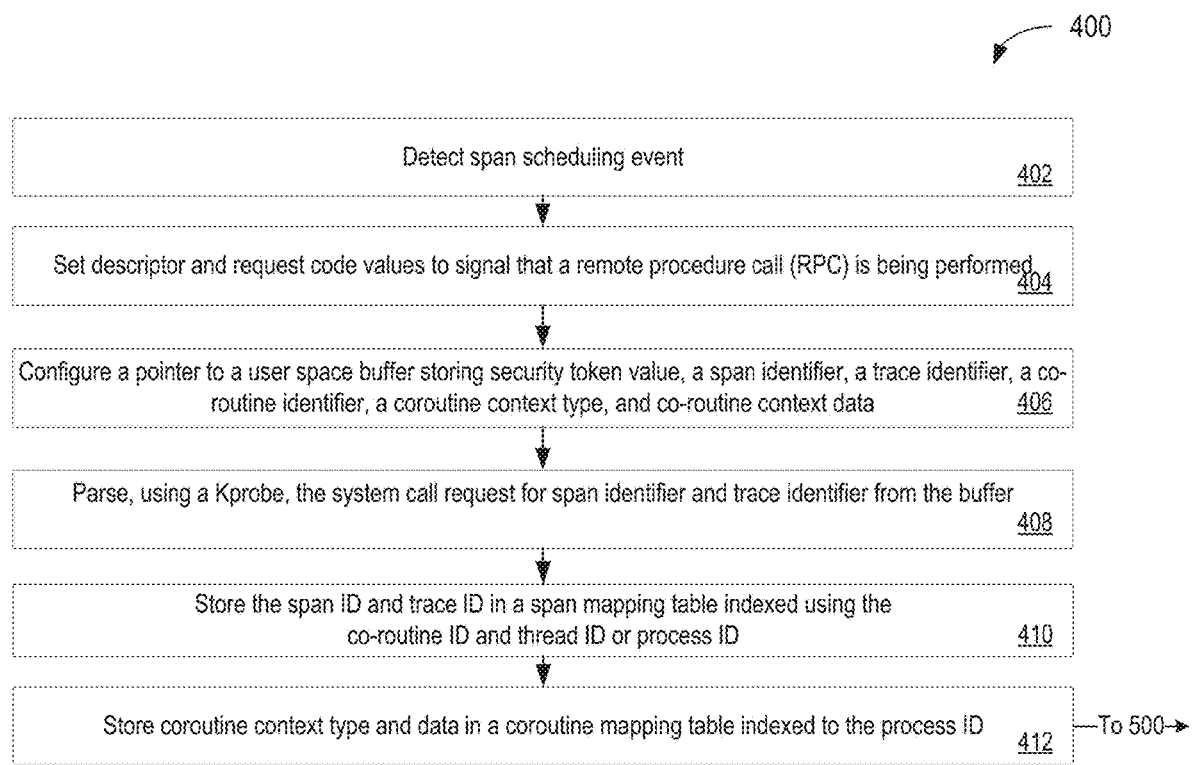
FIG. 4 is a flow diagram illustrating an example process for declaring a span scheduling event for a remote procedure call (RPC) in a kernel space.

FIG. 4 is a flow diagram illustrating an example process 400 for declaring a span scheduling event for a remote procedure call (RPC) in a kernel space. The process 400 can be performed by a monitoring system or client device (e.g., the monitoring system 102 or client device 112a-n described in relation to FIG. 1). The process 400 can be performed using the environment 300 described in relation to FIG. 3A. Process 400 includes performing a RPC call for configuring mapping tables and establishing communication between the kernel space and the user space.

The process 400 includes declaring, by an instrumentation application in the user space, a span scheduling event with a system call. The process includes detecting (402) that a span is scheduled. The process 400 includes configuring the system call by setting (404) descriptor and request fields to predetermined values. The process 400 includes configuring (406) a pointer to a buffer storing a security token value, a span ID, a trace ID, a COID, a coroutine context type, and coroutine context data. The process 400 includes parsing (408), by a Kprobe, the system call request to extract the span ID and the trace ID from the buffer. The process 400 includes storing (410) the span ID in a first mapping table (e.g., mapping table 302 of FIG. 3A) indexed based on the values of the COID and thread ID or process ID. The process 400 includes storing (412) coroutine context data in a second mapping table (e.g., mapping table 304 of FIG. 3A), wherein entries of the second mapping table are indexed to the process ID.

Figure 5:
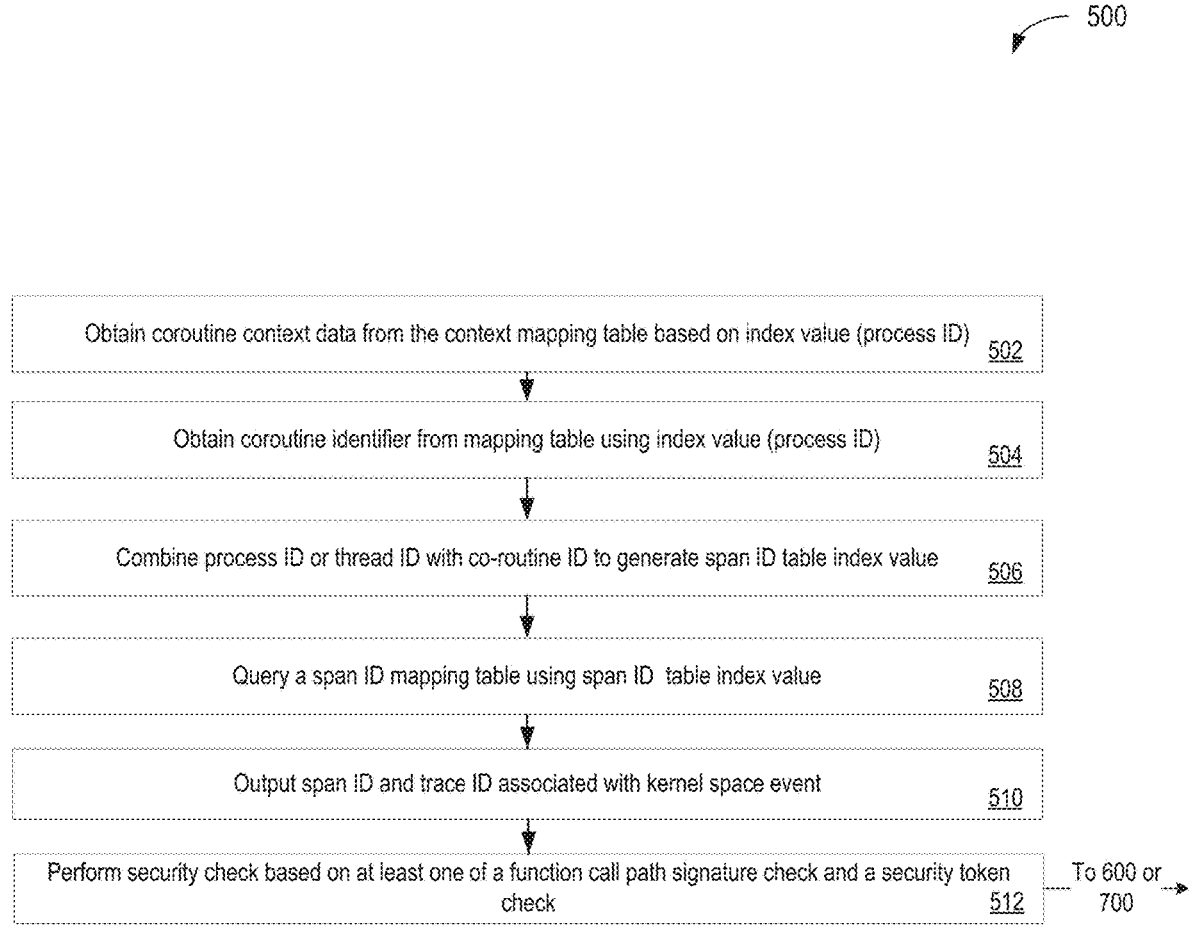
FIG. 5 is a flow diagram illustrating an example process for matching a kernel event in the kernel space to a span in the user space based on the RPC.

FIG. 5 is a flow diagram illustrating an example process 500 for matching a kernel event in the kernel space to a span in the user space based on the RPC of process 400. The process 500 can be performed by a monitoring system or client device (e.g., the monitoring system 102 or client device 112a-n described in relation to FIG. 1). The process 500 can be performed using the environment 300 described in relation to FIG. 3A. The process 500 is initiated when a kernel event occurs. The kernel space helper function provides the process ID or thread ID to the kernel space process. Therefore, the kernel space process obtains the COID for forming the query to the span ID mapping table, which is storing the span ID and/or trace ID for the kernel event.

The process 500 includes obtaining (502) coroutine context data from the mapping table (e.g., table 304 of FIG. 3A) using the process ID as the index value. The process 500 includes obtaining (504) the coroutine identifier from the COID mapping table (e.g., mapping table 306 of FIG. 3A). The process 500 includes combining (506) the process ID or thread ID with the obtained coroutine ID to generate an index value for accessing the span ID mapping table (e.g., mapping table 302 of FIG. 3A). The process 500 includes querying (508) the span ID mapping table using the generated index value from the combined process ID or thread ID and coroutine ID. The process 500 includes outputting (510) the span ID and trace ID associated with the kernel space event. In some implementations, output is a file or service response that includes the span ID and a trace ID for the kernel event. This data can be combined with other reports from other instances of the process 500 or from other client devices in instrumentation summaries for the monitoring system 102.

Figure 6:
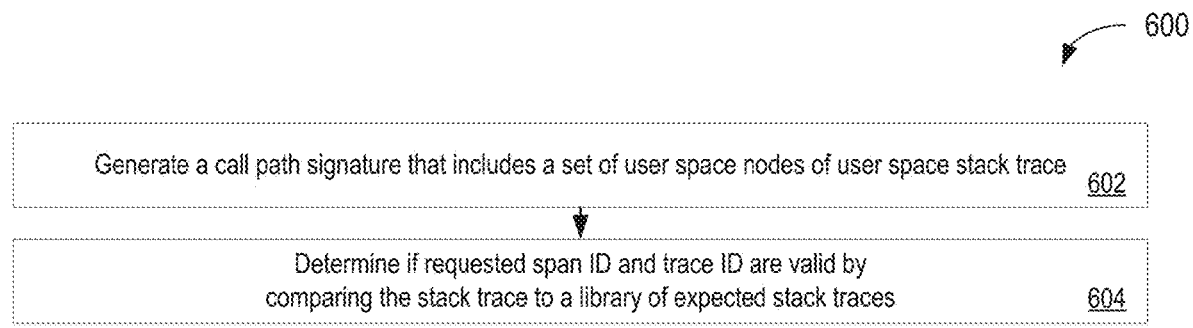
FIG. 6 is a flow diagram illustrating an example process for performing a security check based on a function call path signature check.

FIG. 6 is a flow diagram illustrating an example process 600 for performing a security check based on a function call path signature check. The process 600 can be used to validate RPC calls of process 500 to determine whether the call is from a malicious user or a legitimate user. The process 600 includes generating (602) a call path signature that includes a set of user space nodes of user space stack trace. The process 600 includes determining (604) that the requested span ID and trace ID are valid by comparing the stack trace to a library of expected stack traces for the span ID. Process 600 is similar to the function call security check described in relation to FIG. 3A.

Figure 7:
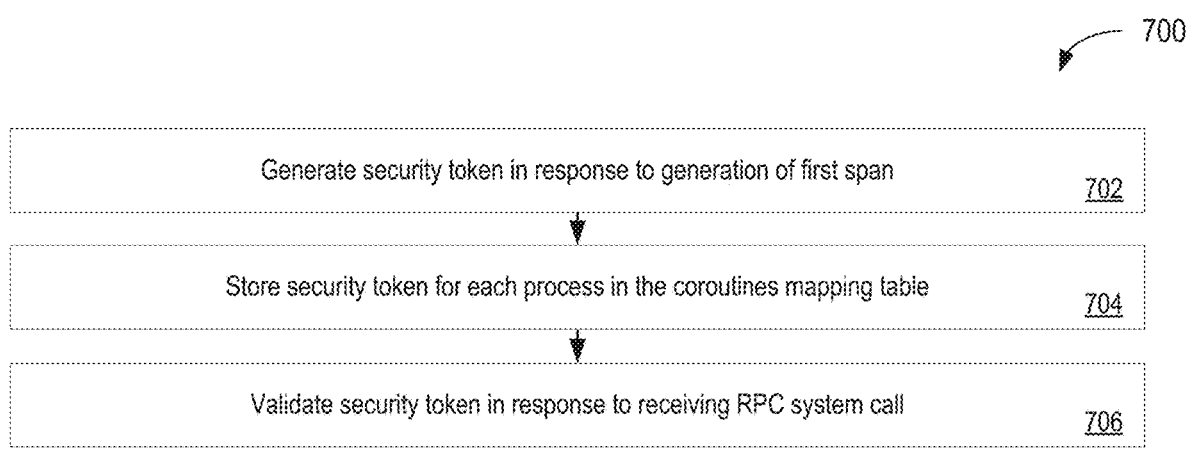
FIG. 7 is a flow diagram illustrating an example process for performing a security check based on a validation of a security token.

FIG. 7 is a flow diagram illustrating an example process for performing a security check based on a validation of a security token. The process 700 can be used to validate RPC calls of process 500 to determine whether the call is from a malicious user or a legitimate user. The process 700 includes generating (702) a security token in response to generation of the first span. The process 700 includes storing (704) the security token for each process in the coroutines mapping table. The process 700 includes validating (706) the security token in response to receiving RPC system calls. Process 700 is similar to the token security check described in relation to FIG. 3A.

Figure 8:
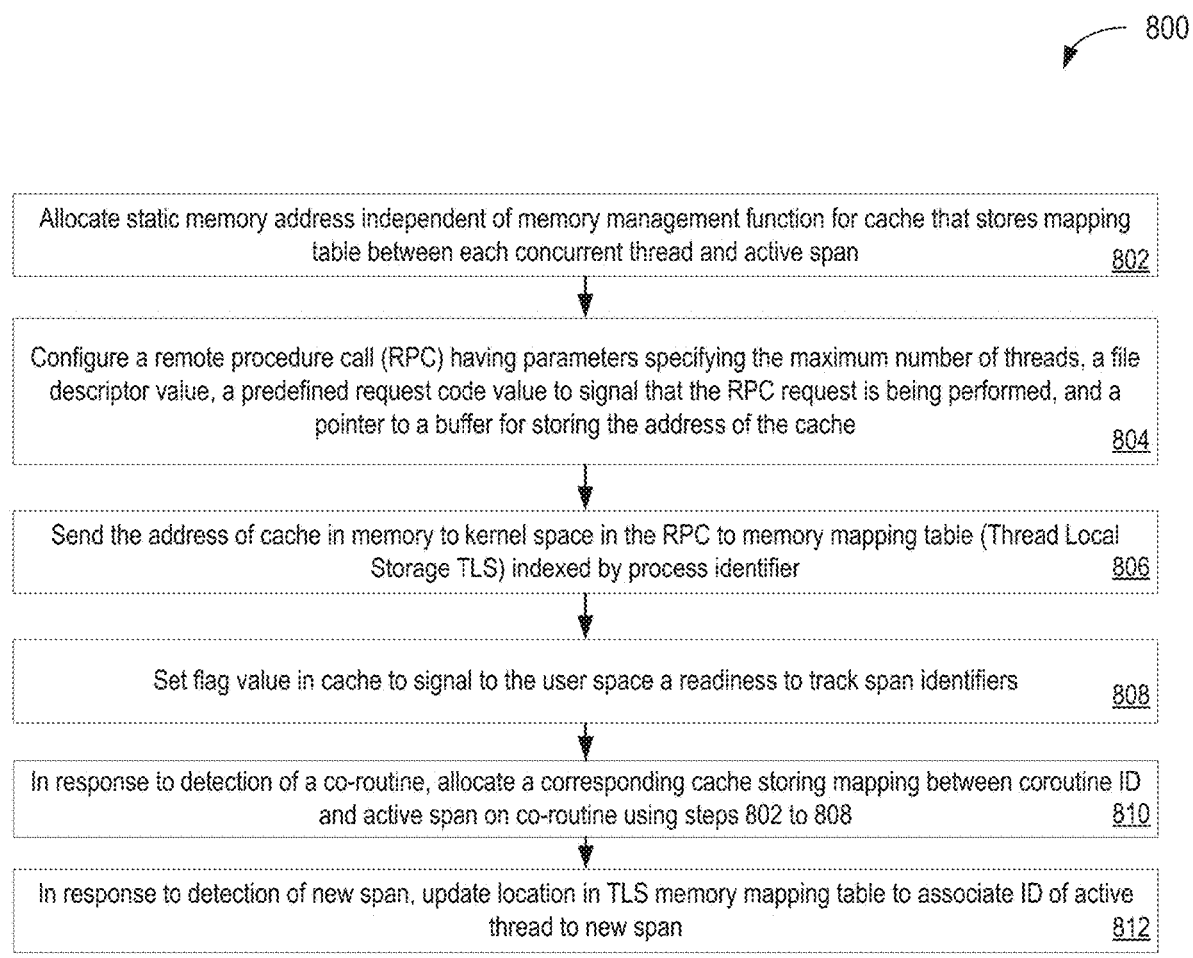
FIG. 8 is a flow diagram illustrating an example process for matching a kernel event in the kernel space to a span in the user space based on a specification for thread local storage.

FIG. 8 is a flow diagram illustrating an example process 800 for matching a kernel event in the kernel space to a span in the user space based on a specification for thread local storage. The process 800 can be performed by a monitoring system or client device (e.g., the monitoring system 102 or client device 112a-n described in relation to FIG. 1). The process 800 can be performed using the environment 350 described in relation to FIG. 3B. The process 800 includes allocating (802) a static memory address independent of memory management function for a cache that stores a mapping table between each concurrent thread and active span. The process 800 includes configuring (804) a remote procedure call (RPC) having parameters specifying the maximum number of threads, a file descriptor value, a predefined request code value to signal that the RPC request is being performed, and a pointer to a buffer for storing the address of the cache. The process 800 includes sending (806) the address of cache in memory to kernel space in the RPC to memory mapping table (Thread Local Storage (TLS)) indexed by process identifiers to the kernel space using an RPC call. The process 800 includes setting (808) a flag value in cache to signal to the user space a readiness to track span identifiers. The process 800 includes, in response to detection of a co-routine, allocating (810) a corresponding cache location storing mapping between coroutine ID and active span on co-routine using steps 802 to 808. Process 800 includes, in response to detection of new span, updating (812) the location in TLS memory mapping table to associate ID of active thread to new span.

Figure 9:
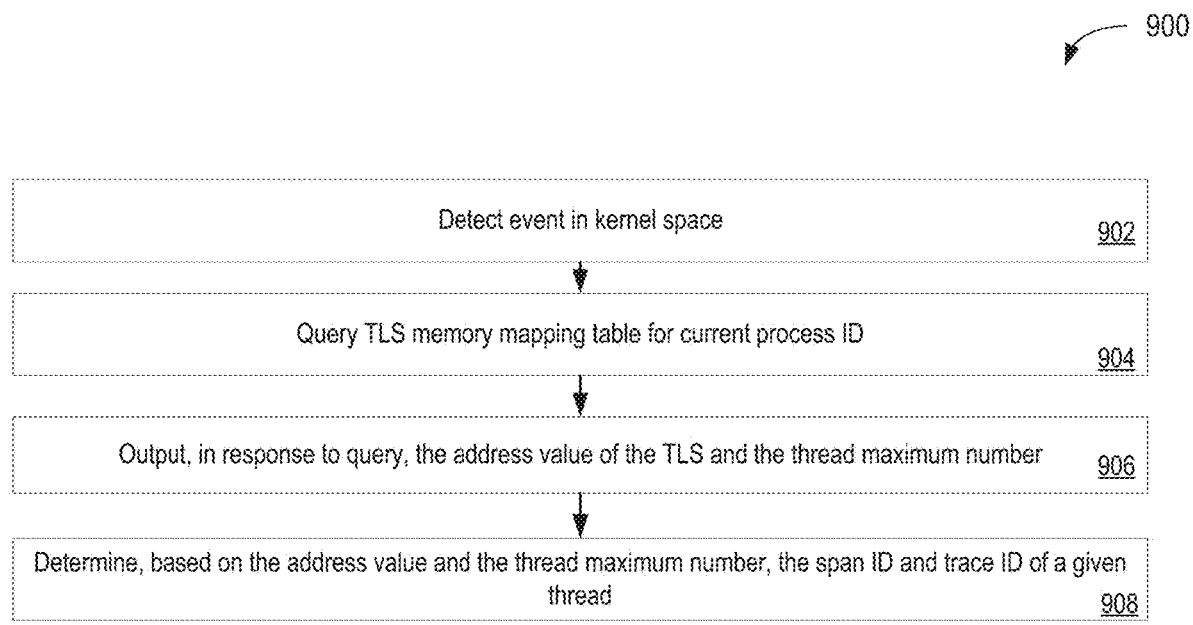
FIG. 9 is a flow diagram illustrating an example process for matching a kernel event in the kernel space to a span in the user space by referencing the specification of the thread local storage.

FIG. 9 is a flow diagram illustrating an example process 900 for matching a kernel event in the kernel space to a span in the user space by referencing the specification of the thread local storage. The process 800 can be performed by a monitoring system or client device (e.g., the monitoring system 102 or client device 112*a-n* described in relation to FIG. 1). The process 800 can be performed using the environment 350 described in relation to FIG. 3B. Process 900 includes detecting (902) an event in kernel space. Process 900 includes querying (904) a TLS memory mapping table (e.g., from process 800) for a current process ID. Process 900 includes outputting (906), in response to query, the address value of the TLS and the thread maximum number. Process 900 includes determining (908), based on the address value and the thread maximum number, the span ID and trace ID of a given thread.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, monitoring system 102 and the client devices 112*a-n* can be implemented using digital electronic circuitry, or in computer software, firmware, or hardware, or in combinations of one or more of them. In another example, the process 800 can be implemented using digital electronic circuitry, or in computer software, firmware, or hardware, or in combinations of one or more of them.

Some implementations described in this specification (e.g., sampling window module 110, the exceptions data profile module 112, reporting module 114, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the monitoring system 102 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 10:
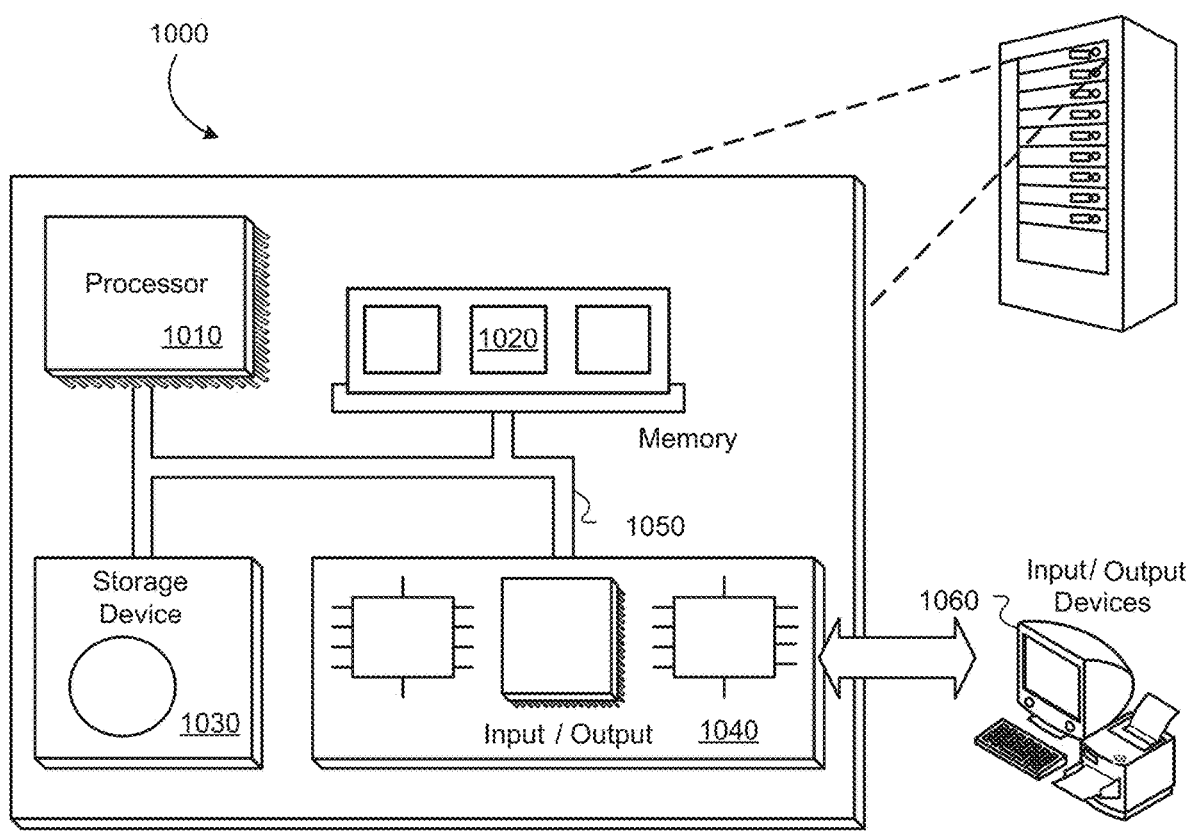
FIG. 10 is a diagram of an example computer system.

FIG. 10 shows an example computer system 1000 that includes a processor 1010, a memory 1020, a storage device 1030 and an input/output device 1040. Each of the components 1010, 1020, 1030 and 1040 can be interconnected, for example, by a system bus 1050. The processor 1010 is capable of processing instructions for execution within the system 1000. In some implementations, the processor 1010 is a single-threaded processor, a multi-threaded processor, or another type of processor. The processor 1010 is capable of processing instructions stored in the memory 1020 or on the storage device 1030. The memory 1020 and the storage device 1030 can store information within the system 1000.

The input/output device 1040 provides input/output operations for the system 1000. In some implementations, the input/output device 1040 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 1060. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for monitoring operations of a computing device, the method comprising:
   detecting a kernel event in a kernel space of the computing device;
   in response to detecting the kernel event, accessing, from a mapping table that maps a computing thread in a user space to a span that is active on the computing thread, a base address of a memory in the user space of the computing device, the memory storing a span identifier for each span in the user space, the span comprising one or more operations of a computing thread that is active in the user space;
   accessing, based on the base address, a span identifier in the memory; and
   associating the span identifier with the kernel event.

2. The method of claim 1, further comprising:
   configuring the mapping table by performing, in the user space, a remote procedure call to the kernel space of the computing device, the remote procedure call storing the base address of the mapping table.

3. The method of claim 2, wherein the remote procedure call stores a value of a maximum number of threads for monitoring, wherein the mapping table stores the value of a maximum number of threads for monitoring, and wherein accessing the span identifier in the memory is based on the value of a maximum number of threads for monitoring.

4. The method of claim 3, wherein configuring the memory comprises:
   determining an allocated size of the memory;
   determining a length in memory of the span identifier and a trace identifier of a trace associated with the span; and
   determining the value of the maximum number of threads for monitoring based on a ratio of the allocated size and the length.

5. The method of claim 1, wherein the memory has a predefined virtual address in the user space.

6. The method of claim 1, wherein the kernel space comprises a virtual machine configured to execute at least one program in an operating system of the computing device.

7. The method of claim 6, wherein the virtual machine is based on an Extended Berkeley Packet Filter (eBPF) specification.

8. The method of claim 1, wherein the kernel event comprises a security event.

9. The method of claim 1, wherein accessing the mapping table comprises executing a kernel helper function.

10. A method for monitoring operations of a computing device, the method comprising:
    detecting a kernel event in kernel space of the computing device;
    obtaining a process identifier or thread identifier for a process or thread that triggered the kernel event;
    accessing, from a first mapping table that maps the process identifier to coroutine context data, coroutine context data that specifies scheduler data for the process or thread that triggered the kernel event;
    accessing a second mapping table that maps coroutine identifiers to the process identifier to obtain a coroutine identifier of a coroutine associated with the process or the thread;
    combining, into a key value based on the scheduler data, the coroutine identifier with the process identifier or thread identifier;
    accessing, using the key value, a third mapping table mapping the process or the thread to at least one of a span identifier and a trace identifier to obtain at least one of the span identifier and the trace identifier associated with the process or the thread; and associating the kernel event with at least one of the span identifier and the trace identifier.

11. The method of claim 10, further comprising:
obtaining a security token, from the second mapping table, associated with the process or the thread; and
validating the security token by matching the security token to a second token stored in the kernel space.

12. The method of claim 10, further comprising:
performing a function call path signatures check of a stack trace associated with the process or the thread; and
validating the span identifier or trace identifier based on the function call path signatures check.

13. The method of claim 10, wherein the kernel space comprises a virtual machine configured to execute at least one program in an operating system of the computing device.

14. The method of claim 13, wherein the virtual machine is based on an Extended Berkeley Packet Filter (eBPF) specification.

15. The method of claim 10, wherein the kernel event comprises a security event.

16. The method of claim 10, wherein accessing the first, second, or third mapping tables comprises executing a kernel helper function.

17. A system for monitoring operations of a computing device, the system comprising:
at least one processor; and
a memory storing instructions that, when executed by the at least one processor, cause the at least one processor to perform operations comprising:
detecting a kernel event in a kernel space of the computing device;
in response to detecting the kernel event, accessing, from a mapping table that maps a computing thread in a user space to a span that is active on the computing thread, a base address of a memory in the user space of the computing device, the memory storing a span identifier for each span in the user space, the span comprising one or more operations of a computing thread that is active in the user space;
accessing, based on the base address, a span identifier in the memory; and
associating the span identifier with the kernel event.

18. The system of claim 17, the operations further comprising:
configuring the mapping table by performing, in the user space, a remote procedure call to the kernel space of the computing device, the remote procedure call storing the base address of the mapping table, wherein the remote procedure call stores a value of a maximum number of threads for monitoring, wherein the mapping table stores the value of a maximum number of threads for monitoring, and wherein accessing the span identifier in the memory is based on the value of a maximum number of threads for monitoring.

19. One or more non-transitory computer readable media storing instructions for monitoring operations of a computing device, the instructions, when executed by at least one processor, configured to cause the at least one processor to perform operations comprising:
detecting a kernel event in the kernel space of the computing device;
in response to detecting the kernel event, accessing, from a mapping table that maps a computing thread in the user space to a span that is active on the computing thread, a base address of a memory in the user space of the computing device, the memory storing a span identifier for each span in the user space, the span comprising one or more operations of a computing thread that is active in the user space;
accessing, based on the base address, a span identifier in the memory; and
associating the span identifier with the kernel event.

20. The one or more non-transitory computer readable media of claim 19, the operations further comprising:
configuring the mapping table by performing, in the user space, a remote procedure call to the kernel space of the computing device, the remote procedure call storing the base address of the mapping table, wherein the remote procedure call stores a value of a maximum number of threads for monitoring, wherein the mapping table stores the value of a maximum number of threads for monitoring, and wherein accessing the span identifier in the memory is based on the value of a maximum number of threads for monitoring.

\* \* \* \* \*

UNITED STATES PATENT AND TRADEMARK OFFICE
CERTIFICATE OF CORRECTION

PATENT NO. : 11,709,720 B1
APPLICATION NO. : 17/652624
DATED : July 25, 2023
INVENTOR(S) : Guillaume Fournier It is certified that error appears in the above-identified patent and that said Letters Patent is hereby corrected as shown below:

In the Claims

Column 26, Line 18, in Claim 19:
Delete "in the" and insert -- in a --.

Column 26, Line 21, in Claim 19:
Delete "the" and insert -- a --.

Signed and Sealed this
Nineteenth Day of September, 2023

Katherine Kelly Vidal
*Director of the United States Patent and Trademark Office*